United States Patent
Diaz Bueno et al.

(10) Patent No.: US 7,086,321 B2
(45) Date of Patent: Aug. 8, 2006

(54) BOOSTED BRAKE HAVING A FEELER PROVIDED WITH A STUD

(75) Inventors: Ignacio Diaz Bueno, La Celle Saint Cloud (FR); Christian Caquet, Courtry (FR); Maurice Gebauer, Sevran (FR)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 11/096,625

(22) Filed: Apr. 1, 2005

(65) Prior Publication Data

US 2005/0241306 A1    Nov. 3, 2005

(30) Foreign Application Priority Data

Apr. 29, 2004   (FR) .................................. 04 04615

(51) Int. Cl.
*F15B 9/10* (2006.01)
(52) U.S. Cl. ..................................... 91/369.2
(58) Field of Classification Search ............... 91/369.1, 91/369.2, 376 R See application file for complete search history.

(56) References Cited

U.S. PATENT DOCUMENTS

| 4,777,865 | A | * | 10/1988 | Gautier ...................... 91/369.2 |
| 5,011,234 | A | * | 4/1991 | Bischoff et al. ........... 91/369.1 |
| 5,746,107 | A | * | 5/1998 | Gautier et al. ............. 91/376 R |
| 5,842,403 | A | * | 12/1998 | Schewe ..................... 91/376 R |
| 6,067,891 | A | * | 5/2000 | Gautier et al. ............. 91/369.2 |

* cited by examiner

*Primary Examiner*—Thomas E. Lazo
(74) *Attorney, Agent, or Firm*—Leo H McCormick, Jr.; Warren Comstock; Sara H Taylor (57) ABSTRACT

A brake system having a master cylinder (14) actuated by a moving piston (24) that is fixed to a moving partition (18) in a booster (12). Piston (24) has a front face (26) that acts on a primary piston (30) of the master cylinder (14) by way of a reaction disk (28) located between a rear end of the primary piston (30). The front face (26) has a feeler (44) that is fixed to a control rod (36) of the booster (12) and comes into contact with the reaction disk (28) to transmit a reaction force from the master cylinder (14) to the control rod (36). The front end (48) of the feeler (44) includes at least one stud (50) which projects parallel to the axial direction and engages the reaction disk (28) to provide for proportionality between the force that is transmitted between the control rod (36) and the force exerted on the primary piston (30).

8 Claims, 9 Drawing Sheets

BOOSTED BRAKE HAVING A FEELER PROVIDED WITH A STUD

BACKGROUND OF THE INVENTION

The invention relates more specifically to a boosted brake for a motor vehicle, of the type which comprises a pneumatic brake booster actuating a master cylinder, of the type in which the booster comprises a rigid casing inside which can move a transverse partition sealably delimiting a front chamber subjected to a first pressure and a rear chamber subjected to a second pressure, of the type in which the booster comprises a moving piston fixed to the moving partition and comprising a front face which can act on a primary piston of the master cylinder by way of a reaction disk which is fixed to a rear end of the primary piston, of the type in which the booster comprises a control rod which moves in the piston selectively as a function of an axial input force exerted forward against a return force exerted on the rod by a return spring, of the type in which the front end of the control rod comprises at least one plunger which is mounted slideably in the piston and is connected to at least one annular seat of a valve which is able to set up in the rear chamber a second pressure which is greater than the first pressure prevailing in the front chamber so as to cause the moving partition to move, of the type in which the booster comprises a feeler, arranged at the front end of the plunger and passing through a bore leading from the piston, which, when the control rod is in a rest position, is arranged at a defined jump distance from the reaction disk and which is able, when the control rod is actuated with an input force whose intensity is greater than a first defined intensity, to come into contact with the reaction disk in such a way as to transmit to the plunger and to the control rod the reaction force of the master cylinder.

Many examples of boosted brakes of this type are known.

In such a boosted brake, the output force of the booster which is applied to the primary piston of the master cylinder depends on the input force applied to the control rod.

Typically, during the application of a braking force with an intensity greater than a defined intensity, a distinction is made between four phases followed by the output force.

During a first phase referred to as dead travel phase, the output force is substantially zero. This travel corresponds to the travel of the control rod required to overcome the force of the return spring.

Then, during a second phase referred to as jump phase, and for a defined value of the input force, the output force increases abruptly up to a first defined value, independently of the value of the input force. This travel corresponds to the absorption of the jump distance by the feeler.

Then, during a third phase referred to as boost phase, the output force increases substantially linearly from the first defined value up to a second defined value as a function of the input force. This phase corresponds to the boost given to the output force by the booster.

Finally, during a fourth phase referred to as saturation phase, the output force increases substantially linearly from the second defined value as a function of the input force. The increase in the output force is less than the increase during the boost phase, since the moving wall of the booster has reached the end of its travel and provides no more boost. Any additional braking force is provided only by the control rod.

This design presents a problem in terms of progressivity. Specifically, during the second phase, the output force increases abruptly for a defined value of the force exerted on the control rod. The reaction force resulting therefrom also increases abruptly for its part and this results in an unpleasant pedal feel for the driver of the vehicle.

Moreover, the transition between the second and third phases also takes place abruptly for its part and causes the increase in the output force to slow down suddenly, which is manifested at the moment of this transition as a soft feel in the reaction force which is transmitted to the pedal and felt by the driver.

SUMMARY OF THE INVENTION

To overcome these disadvantages, the invention provides a boosted brake comprising a new type of feeler making it possible to achieve progressivity between the output force and the input force during at least one of the second or third phases.

To this end, the invention provides a boosted brake of the above-described type, characterized in that the front end of the feeler comprises at least one stud which projects parallel to the axial direction and which is intended to enable the feeler, in at least one part of a jump phase during which it covers the jump distance before coming fully into contact with the reaction disk, to provide proportionality between the force which is transmitted to it by the plunger and the force exerted on the primary piston of the master cylinder.

According to other features of the invention:
the front end of the feeler comprises a single stud which is coaxial with the feeler,
the stud is substantially cylindrical in shape and its diameter is less than the diameter of the feeler,
the diameter of the stud is equal to the diameter of the feeler,
the end of the stud consists of a flat transverse face,
the end of the stud consists of a flat transverse face into which opens a cavity,
the cavity has a frustoconical shape,
the end of the stud is frustoconical in shape.

Other features and advantages of the invention will become apparent on reading the detailed description which follows and which will be understood by referring to the appended drawings.

BRIEF DESCRIPTION OF THE INVENTION

In the description which will follow, identical reference numbers denote components which are identical or have similar functions.

By convention, the terms "front", "rear", "upper" and "lower" respectively denote elements or positions which are respectively directed toward the left, the right, the top or the bottom of FIGS. 1 to 16.

Figure 1:
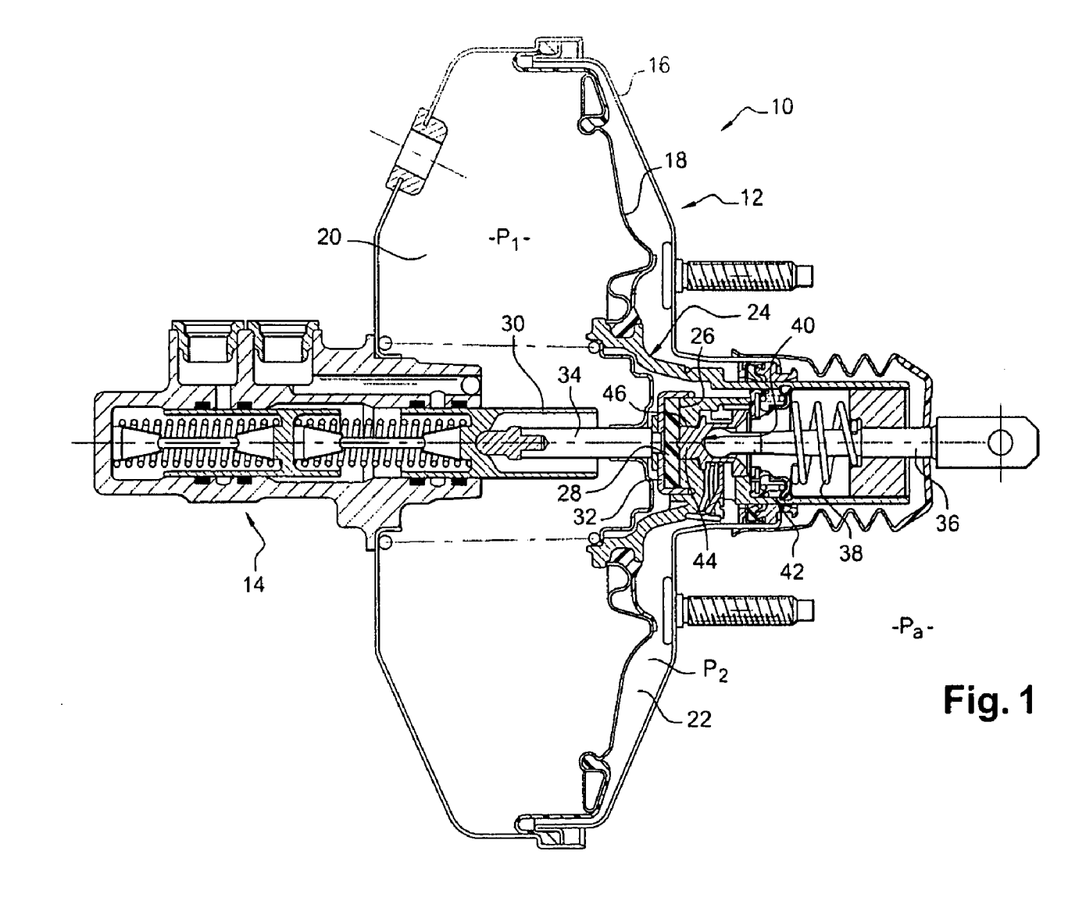
FIG. 1 is a view in axial section of a boosted brake according to the invention represented in a rest position.

FIG. 1 represents a boosted brake 10 for a motor vehicle in its entirety.

In a known way, the boosted brake 10 comprises a pneumatic brake booster 12 actuating a master cylinder 14. The booster 12 comprises a rigid casing 16 inside which can move a transverse partition 18 sealably delimiting a front chamber 20 subjected to a first pressure "$P_1$" and a rear chamber 22 subjected to a second pressure "$P_2$".

Inside the casing 16, the booster 12 comprises a moving piston 24 which is fixed to the moving partition 18 and comprises a front face 26 which can act on a primary piston 30 of the master cylinder 14 by way of a reaction disk 28 which is fixed to a rear end of the primary piston 30. In particular, the reaction disk 28 is accommodated in a cage 32 fixed to a rod 34 which is accommodated in the primary piston 30 of the master cylinder 14.

The booster 12 comprises a control rod 36 which moves in the piston 24 selectively as a function of an axial input force exerted forward against a return force exerted on the rod 36 by a return spring 38.

In a known way, the front end of the control rod 36 comprises at least one plunger 40 which is slideably mounted in the piston 24 and is connected to at least one annular seat of a valve 42 which is able to set up in the rear chamber 22 a second pressure "$P_2$" which is greater than the first pressure "$P_1$" prevailing in the front chamber 20 so as to cause the moving partition 18 to move. For example, the rear chamber 22 may be placed in communication with the external environment subjected to the atmospheric pressure "$P_a$" prevailing outside of the boosted brake 10.

Figure 2:
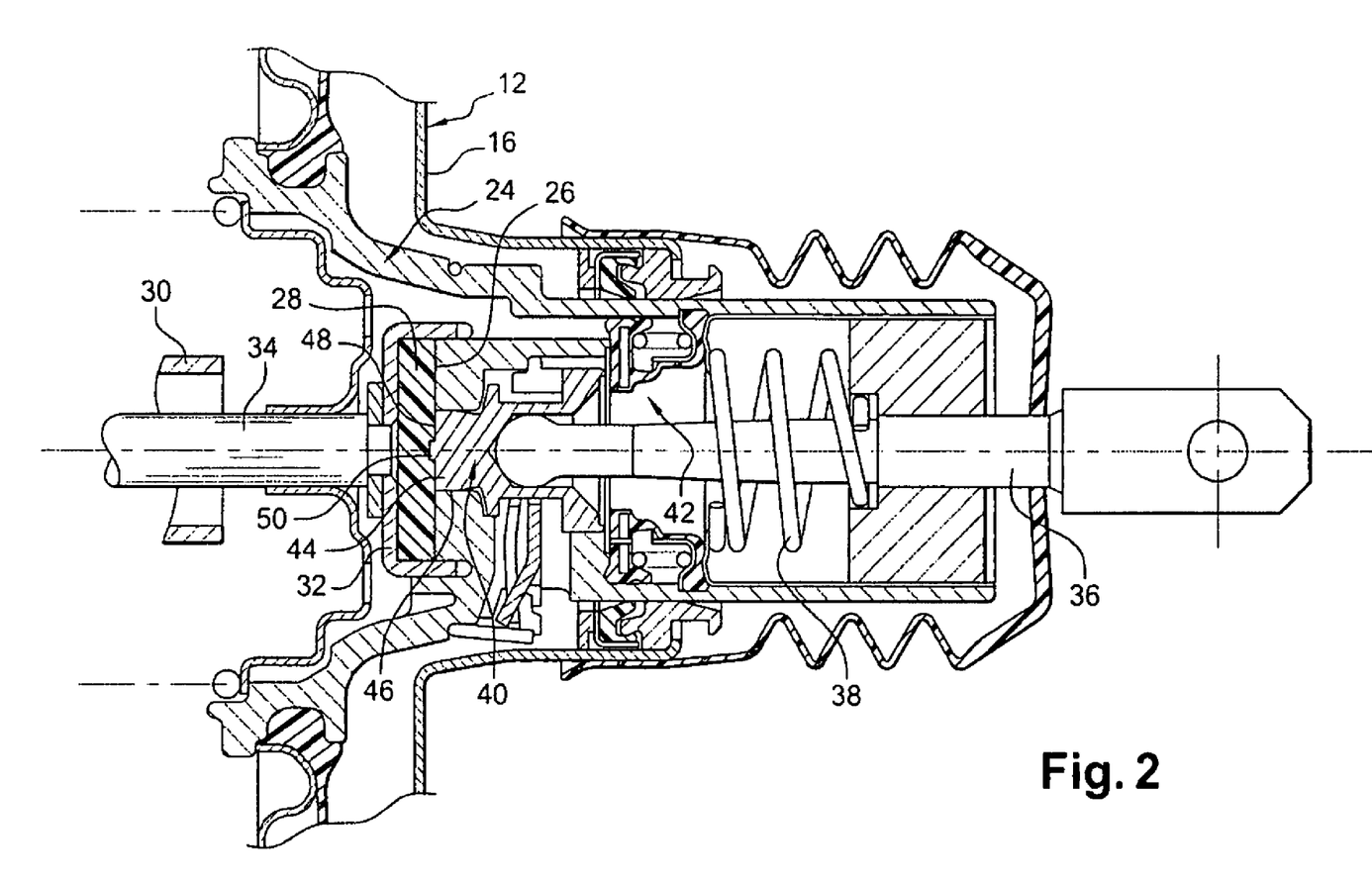
FIG. 2 is a detail view in axial section of a boosted brake according to the invention represented at the start of braking in the dead travel and jump phases.
Figure 3:
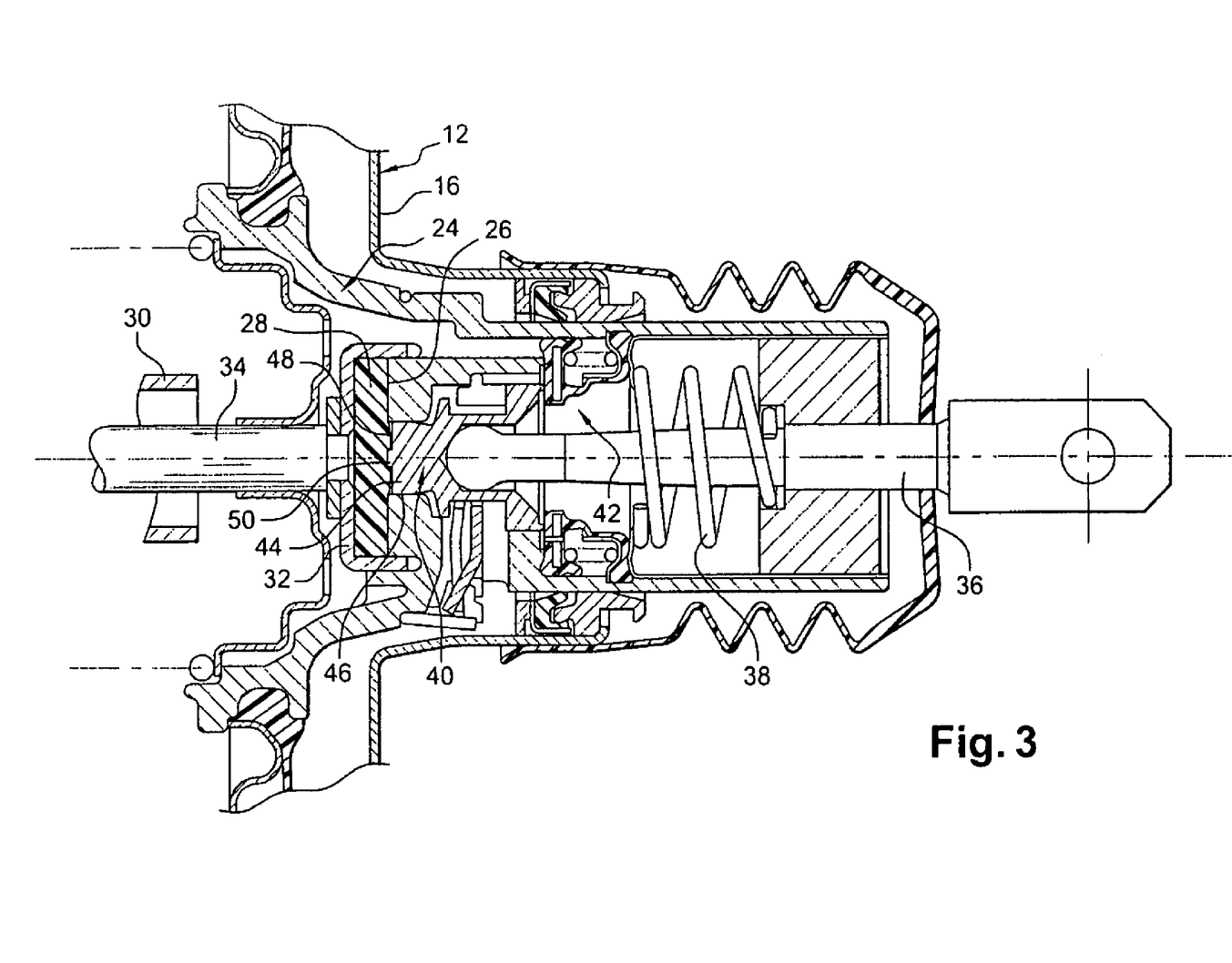
FIG. 3 is a detail view in axial section of a boosted brake according to the invention represented in the course of braking in the boost phase.
Figure 4:
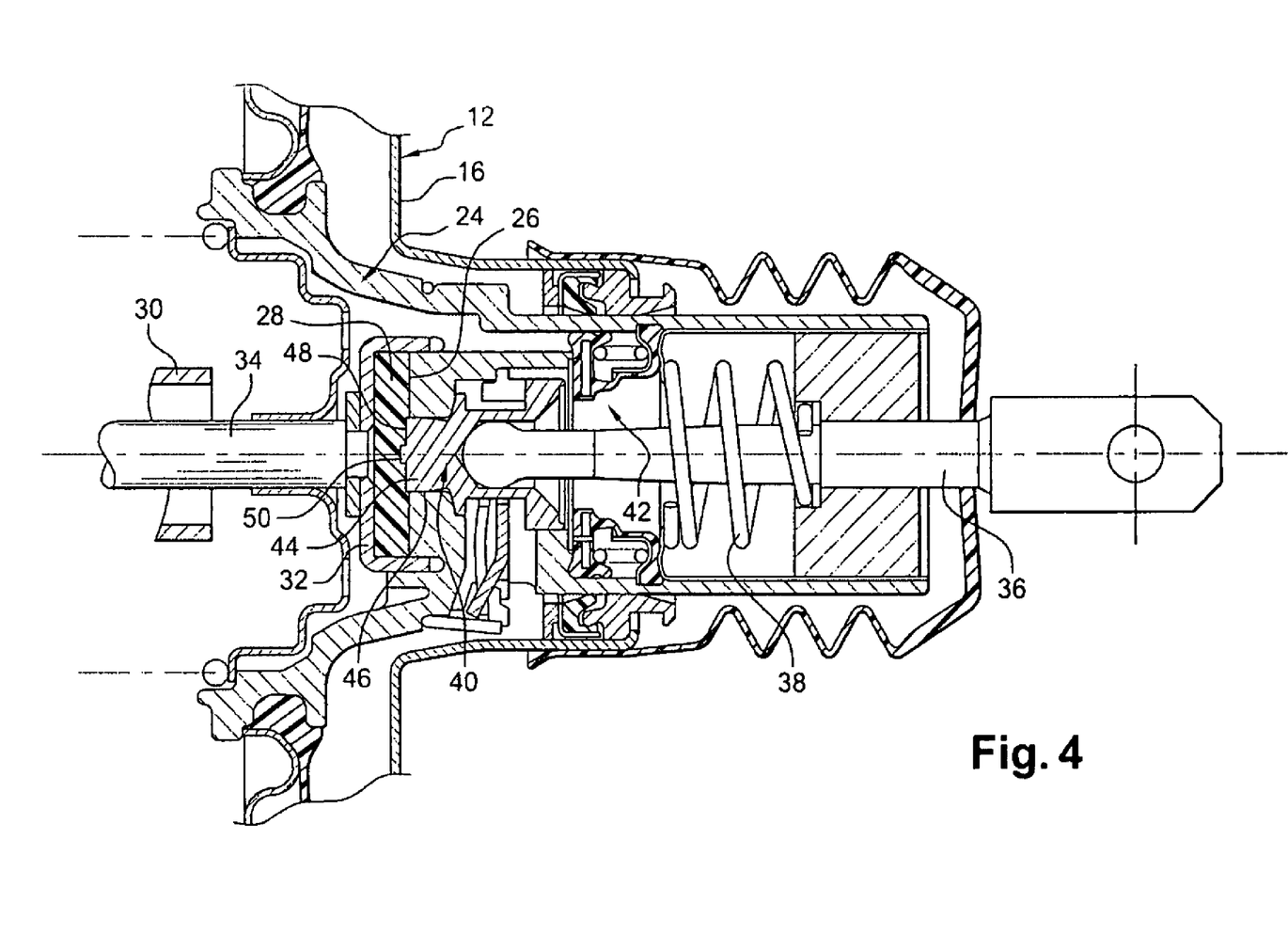
FIG. 4 is a detail view in axial section of a boosted brake according to the invention represented in the course of braking in the saturation phase.

The booster 12 comprises a feeler 44, arranged at the front end of the plunger 40 and passing through a bore 46 leading from the piston 24, which, when the control rod 36 is in a rest position, is arranged at a defined jump distance from the reaction disk 28 and which is able, when the control rod 36 is actuated with an input force whose intensity is greater than a first defined intensity, to come into contact with the reaction disk 28 in such a way as to transmit to the plunger 40 and to the control rod 36 the reaction force of the master cylinder 14, as represented in FIGS. 2 to 4.

Typically, during the application of a braking force with an intensity greater than a defined intensity on the control rod 36, a distinction is made between four phases followed by the output force which is applied to the primary piston 30.

Figure 12:
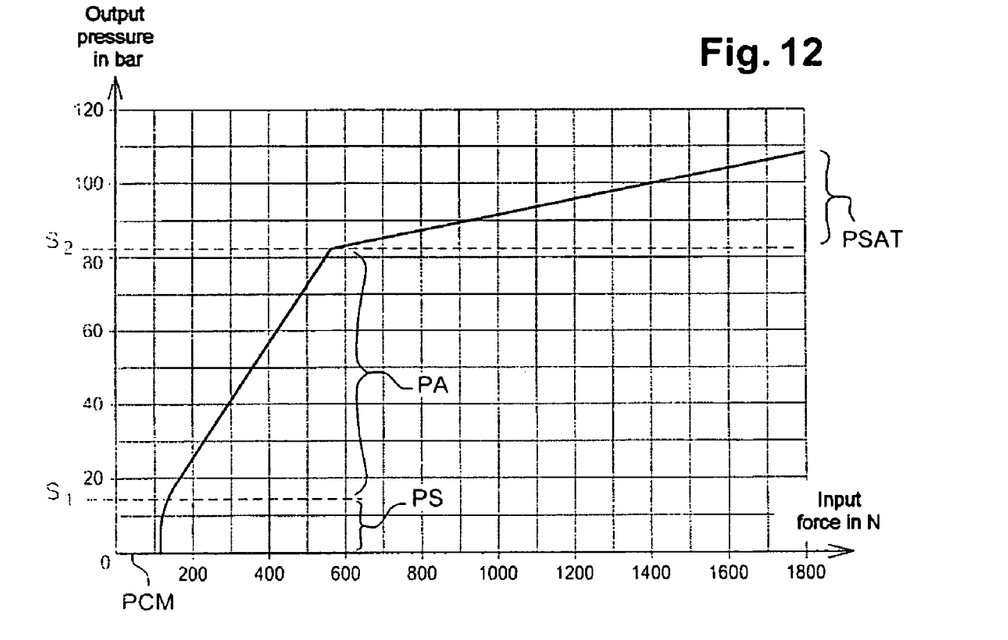
FIGS. 12 to 16 are curves representing the output force as a function of the input force, associated respectively with the feelers of FIGS. 6 and 8 to 11.

These phases have been represented in FIG. 12, with the Y-axis representing the output force, expressed in bar, which is applied to the primary piston 30 as a function of the force exerted on the control rod 36, this force being represented on the x-axis and expressed in newtons.

During a first phase "PCM" referred to as dead travel phase, the output force is substantially zero. This travel corresponds to the travel of the control rod 36 required to overcome the force of its return spring 38.

Then, during a second phase "PS" referred to as jump phase, and for a defined value of the input force, the output force increases abruptly up to a first defined value "S1" and independently of the value of the input force. This travel corresponds to the absorption of the jump distance by the feeler 44.

Then, during a third phase "PA" referred to as boost phase, the output force increases substantially linearly from the first defined value "S1" up to a second defined value "S2" as a function of the input force.

This phase "PA" corresponds to the boost given to the output force by the booster.

Finally, during a fourth phase "PSAT" referred to as saturation phase, the output force increases substantially linearly from the second defined value "S2" as a function of the input force. The increase in the output force is less than the increase during the boost phase, since the moving wall 18 of the booster has reached the end of its travel and provides no more boost. Any additional braking force is provided only by the control rod 36.

Figure 6:
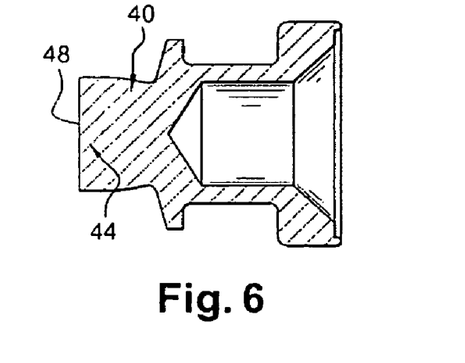
FIG. 6 is a view in axial section representing a conventional feeler.

As can be observed from FIG. 12, which is associated with a plunger 40 comprising a feeler 44 with a flat end 48 similar to that which has been represented in FIG. 6, this design presents a problem in terms of progressivity. Specifically, during the second phase "PS", the output force increases abruptly for a defined value of the force exerted on the control rod 36. The reaction force which results therefrom also increases abruptly for its part and this results in an unpleasant pedal feel for the driver of the vehicle.

Moreover, the transition between the second and third phases "PS" and "PA" also takes place abruptly for its part, that is to say that it is manifested on the curve by a marked change in slope, and it causes the increase in the output force to slow down suddenly, which is manifested at the moment of this transition by a soft feel in the reaction force which is transmitted to the pedal and felt by the driver.

To overcome these disadvantages, the invention provides a boosted brake comprising a new type of feeler 44 which makes it possible to achieve progressivity between the output force and the input force during at least one of the two aforementioned phases "PS" and "PA".

To this end, the invention provides a boosted brake of the above-described type, characterized in that the front end 48 of the feeler 44 comprises at least one stud 50 which projects parallel to the axial direction and which is intended to enable the feeler 44, in at least one part of the jump phase "PS" during which it covers the jump distance before coming fully into contact with the reaction disk 28, to provide proportionality between the force which is transmitted to it by the plunger 40 and the force exerted on the primary piston 30 of the master cylinder 14.

In the preferred embodiment of the invention, the front end 48 of the feeler 44 comprises a single stud 50 arranged coaxially with the feeler 44.

This configuration does not restrict the invention, and the front end 48 of the feeler 44 could comprise a plurality of axial studs 50 of given shape distributed angularly about the axis of the feeler 44.

Figure 8:
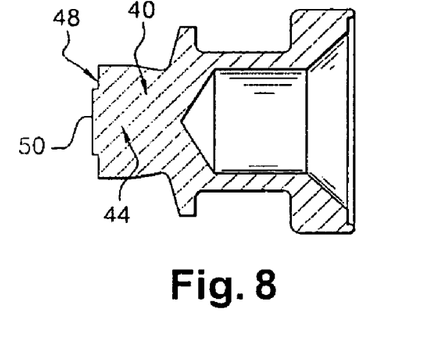
Figure 9:
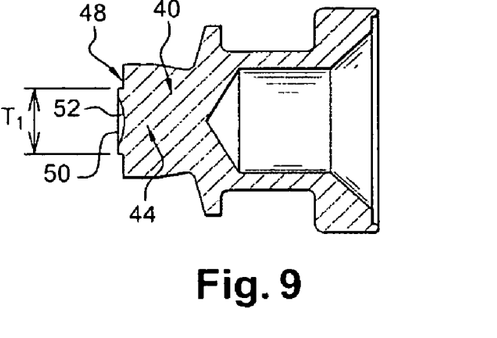
Figure 10:
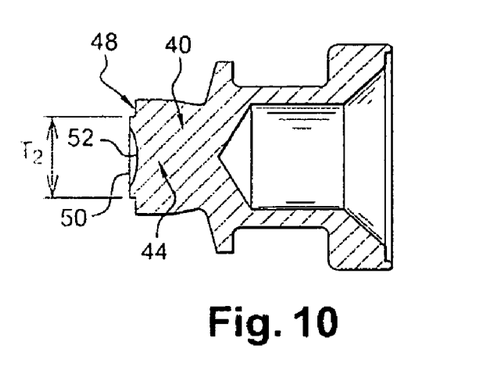

According to the first to third embodiments of the invention which have been represented in FIGS. 8 to 10, the stud 50 is substantially cylindrical in shape and its diameter is less than the diameter of the feeler 44.

More specifically, in the first embodiment of the invention which has been represented in FIG. 8, the end of the stud 50 consists of a flat transverse face.

According to this design, as illustrated in FIG. 1, the feeler 44 is initially arranged at a defined jump distance from the reaction disk 28.

On completion of the dead travel phase "PCM", as illustrated in FIG. 2, the stud 50 enters the reaction disk 28 even though the feeler 44 has not yet completely entered said reaction disk 28, and it transmits part of the input force of the control rod 36. This configuration is established along the whole length of the jump travel "PS" and makes it possible to achieve progressivity of the output force as a function of the input force for the feeler 44 of the type shown in FIGS. 1 to 4.

Then, during the boost phase "PA" which corresponds to FIG. 3, only the stud 50 is in contact with the reaction disk 28. The output force is a function of the input force and of the boost force of the booster 12.

Finally, during the saturation phase "PSAT" which corresponds to FIG. 4, the feeler 44 completely enters the reaction disk 28 and fully transmits the input force.

The output force then no longer receives any additional boost force from the booster 12.

Figure 5:
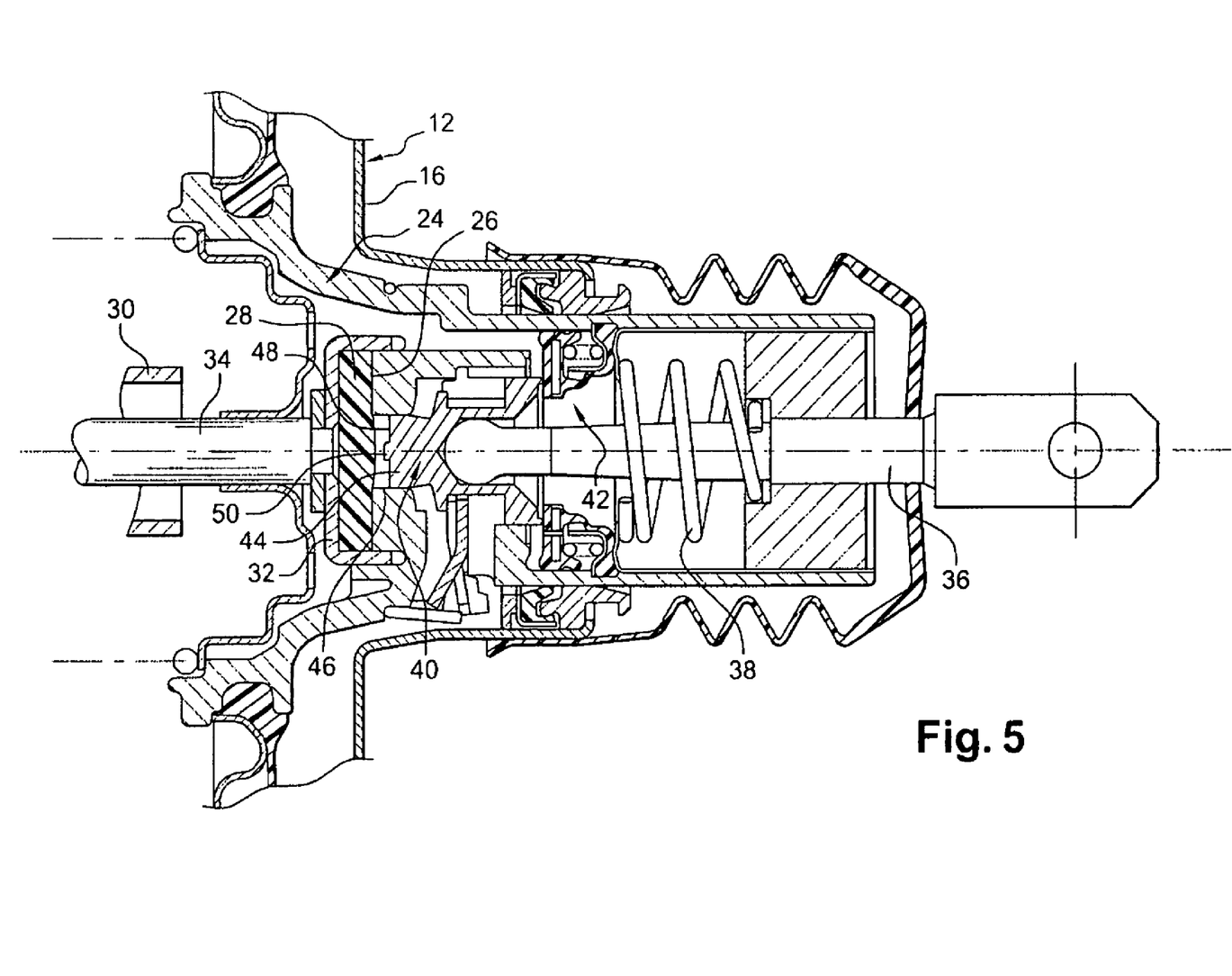
FIG. 5 is a detail view in axial section of a boosted brake according to the invention represented in the course of relaxation of the braking.

If the input force exerted on the control rod 36 is released, the feeler 44 and the stud 50 are withdrawn from the reaction disk 28, as represented in FIG. 5.

Figure 13:
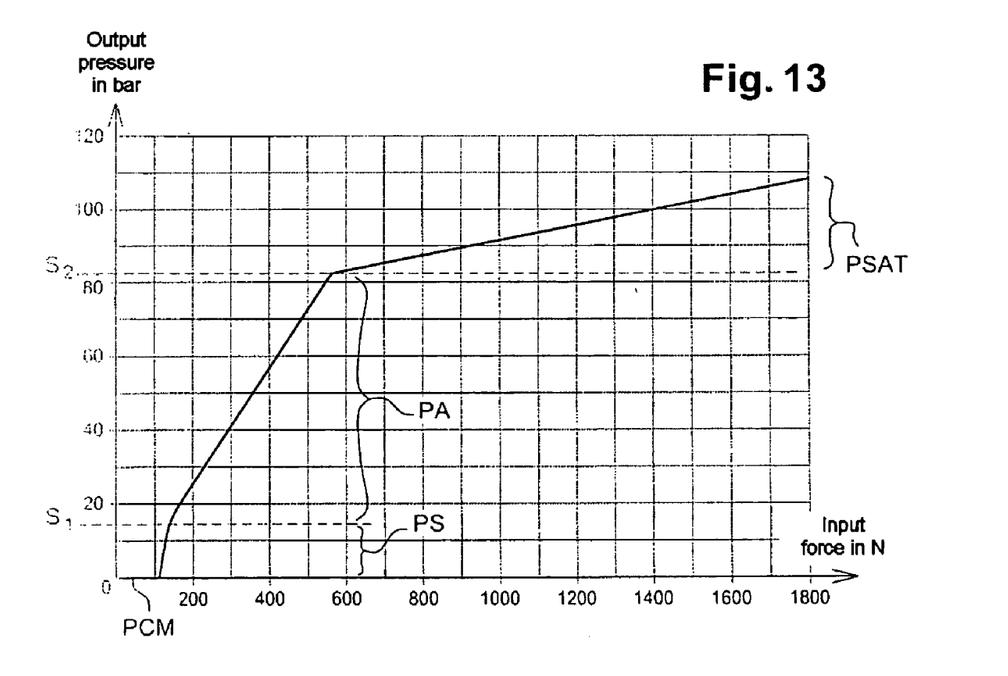

In this configuration, as can be seen in FIG. 13, during the second jump phase "PS" the output force increases rapidly and in proportion to the input force.

Moreover, the transition between the second and third phases "PS" and "PA" takes place progressively, thereby eliminating the soft effect felt on the pedal.

In the second and third embodiments of the invention which have been represented in FIGS. 9 and 10, the end 48 of the stud 50 consists of a flat transverse face into which opens a cavity 52.

Preferably, the cavity 52 has a frustoconical shape, but this configuration does not restrict the invention, and it could be shaped as a sphere portion.

Figure 14:
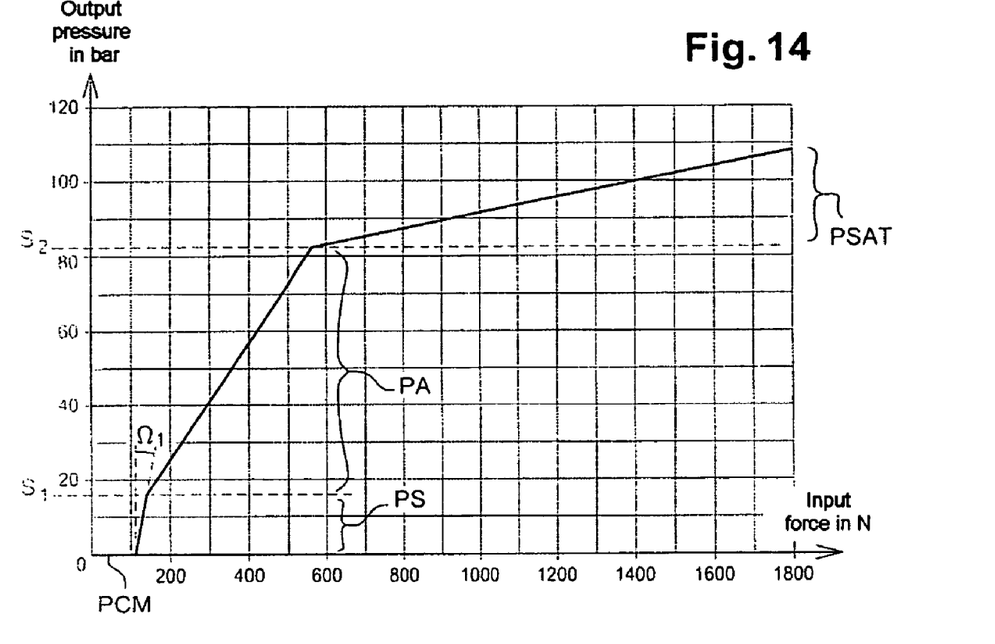
Figure 15:
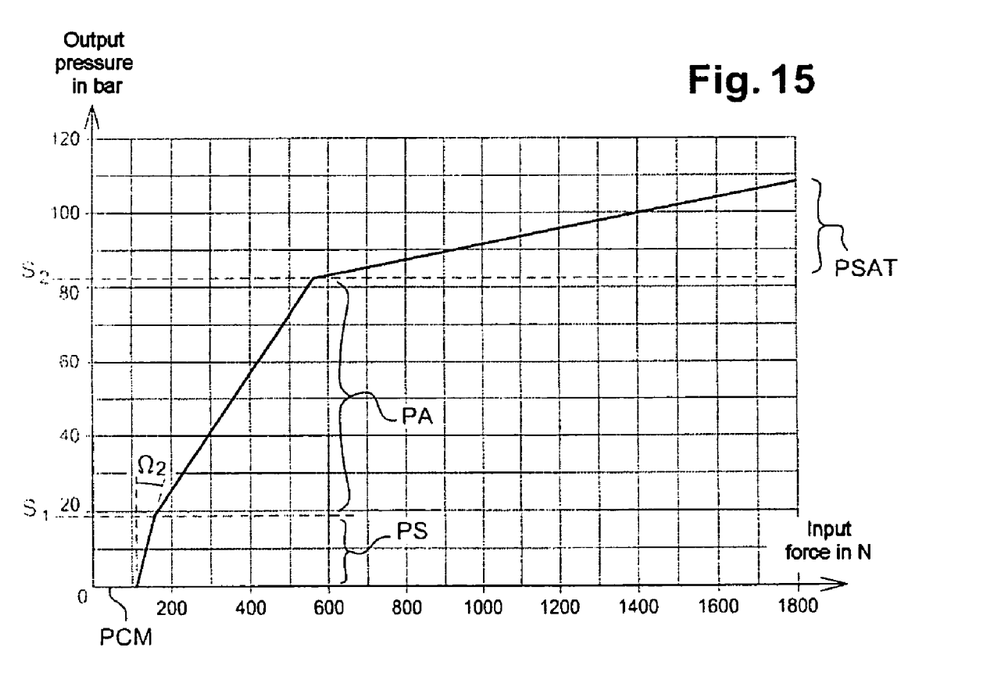

In this configuration, as can be seen in FIGS. 14 and 15, during the second jump phase "PS" the output force increases rapidly and in proportion to the input force. The smaller the diameter "T1", "T2" of the stud 50, the smaller the value of the output force "S2" marking the transition between the second and third phases "PS" and "PA", i.e. the earlier the third boost phase "PA" comes into play. The slope "Ω1" and "Ω2" of the curve in the phase "PS" is a direct function of the value associated with the diameter "T1", "T2" of the associated stud 50.

Figure 7:
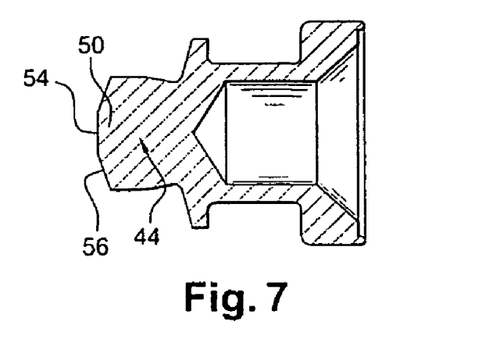
FIGS. 7 to 11 are views in axial section representing various embodiments of a feeler for a boosted brake according to the invention.
Figure 11:
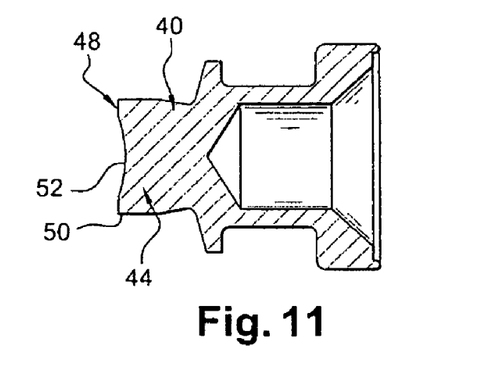

In the fourth and fifth embodiments of the invention which have been represented in FIGS. 7 and 11, the diameter of the stud 50 is equal to the diameter of the feeler 44.

In this configuration, the stud 50 therefore consists in the end of the feeler 44 being shaped in a particular way.

More specifically, in the fourth embodiment of the invention shown in FIG. 7, the end 48 of the stud 50 is frustoconical in shape. It comprises a flat face 54 whose frustoconical region 56 joins the edges of the feeler 44.

This configuration does not restrict the invention, and it will be understood that the end 48 of the stud 50 could be spherical in shape without changing the nature of the invention.

Analogously, in the fifth embodiment of the invention, which has been represented in FIG. 11, the end 48 of the stud 50 consists of a flat transverse face of the same diameter as the feeler 44, into which face opens a cavity 52. This cavity 52 is preferably frustoconical in shape but it could be of any other shape, for example spherical.

Figure 16:
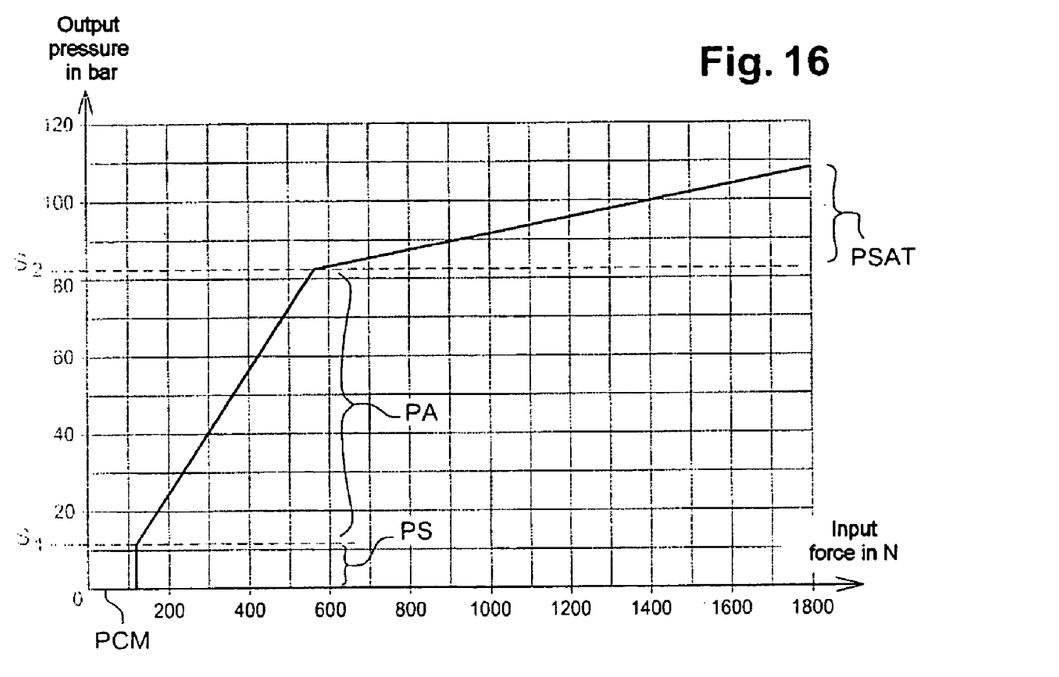

In this configuration, as can been seen in FIG. 16, the transition between the second and third phases "PS" and "PA" takes place progressively, thereby eliminating the soft effect felt on the pedal.

The invention therefore makes it possible to substantially modify the types of feel transmitted to the pedal by the control rod and to improve the user comfort of a boosted brake 10.

The invention claimed is:

1. A boosted brake (10) for a motor vehicle, comprising a pneumatic brake booster (12) for actuating a master cylinder (14) having a rigid casing (16) inside which can move a transverse partition (18) sealably delimiting a front chamber (20) subjected to a first pressure ($P_1$) and a rear chamber (22) subjected to a second pressure ($P_2$), a moving piston (24) fixed to the moving partition (18) and comprising a front face (26) that acts on a primary piston (30) of the master cylinder (14) by way of a reaction disk (28) which is fixed to a rear end of the primary piston (30), a control rod (36) which moves in the piston (24) selectively as a function of an axial input force exerted forward against a return force exerted on the rod (36) by a return spring (38), said control rod (36) having a front end comprises at least one plunger (40) which is mounted slideably in the piston (24) and is connected to at least one annular seat of a valve (42) which is able to set up in the rear chamber (22) a second pressure ($P_2$) which is greater than the first pressure ($P_1$) prevailing in the front chamber (20) so as to cause the moving partition (18) to move a feeler (44), arranged at the front end of the plunger (40) and passing through a bore (46) leading from the piston (24), which, when the control rod (36) is in a rest position, is arranged at a defined jump distance from the reaction disk (28) and when the control rod (36) is actuated with an input force whose intensity is greater than a first defined intensity, to come into contact with the reaction disk (28) in such a way as to transmit to the plunger (40) and to the control rod (36) the reaction force of the master cylinder (14), characterized in that a front end (48) of the feeler (44) comprises at least one stud (50) which projects parallel to the axial direction and enables the feeler (44), in at least one part of a jump phase (PS) during which it covers the jump distance before coming fully into contact with the reaction disk (28), to provide proportionality between the force which is transmitted to the front end (48) by the plunger (40) and the force exerted on the primary piston (30) of the master cylinder (14).

2. The boosted brake (10) according to claim 1, characterized in that the front end (48) of the feeler (44) comprises a single stud (50) which is coaxial with the feeler (44).

3. The boosted brake (10) according to claim 2, characterized in that the stud (50) is substantially cylindrical in shape and in that its diameter is less than the diameter of the feeler (44).

4. The boosted brake (10) according to claim 3, characterized in that the end (48) of the stud consists of a flat transverse face.

5. The boosted brake (10) according to claim 4, characterized in that the end (48) of the stud (50) is frustoconical in shape.

6. The boosted brake (10) according to claim 2, characterized in that the diameter of the stud (50) is equal to the diameter of the feeler (44).

7. The boosted brake (10) according to claim 6, characterized in that the end (48) of the stud (50) consists of a flat transverse face into which opens a cavity (52).

8. The boosted brake (10) according to claim 7, characterized in that the cavity (52) has a frustoconical shape.

* * * * *